(12) United States Patent
Frisoli

(10) Patent No.: US 11,345,375 B1
(45) Date of Patent: May 31, 2022

(54) TRAIN ANTI-DERAILMENT AND BRAKING SYSTEM

(71) Applicant: David Frisoli, Edison, NJ (US)

(72) Inventor: David Frisoli, Edison, NJ (US)

( * ) Notice: Subject to any disclaimer, the term of this patent is extended or adjusted under 35 U.S.C. 154(b) by 638 days.

(21) Appl. No.: 16/285,343

(22) Filed: Feb. 26, 2019

(51) Int. Cl.
*B61H 7/06* (2006.01)

(52) U.S. Cl.
CPC ..................... *B61H 7/06* (2013.01)

(58) Field of Classification Search
CPC ......... B61F 9/00; B61H 9/006; Y10T 16/381; H02P 3/00; H02P 3/04; H02P 3/06; H02P 3/065; H02P 3/0812; H02P 3/14; H02P 3/16
USPC .................... 104/246; 188/356, 43
See application file for complete search history.

(56) References Cited

U.S. PATENT DOCUMENTS

| | | | | |
|---|---|---|---|---|
| 1,087,773 | A * | 2/1914 | Johnson | B61F 9/00 104/246 |
| 1,123,284 | A | 1/1915 | Hascsak | |
| 1,252,998 | A | 1/1918 | Castanho | |
| 1,422,021 | A | 7/1922 | Zeis | |
| 1,791,663 | A | 2/1931 | Edson | |
| D142,104 | S | 8/1945 | Markestein | |
| 2,800,861 | A | 7/1957 | Joseph | |
| 2,900,923 | A * | 8/1959 | Hayes | B61K 7/20 104/258 |
| 2,942,557 | A * | 6/1960 | Hirsch | B61H 7/02 104/134 |
| 4,373,613 | A * | 2/1983 | West | B61H 7/04 188/170 |
| 5,865,122 | A * | 2/1999 | Hudson | B61K 7/18 104/259 |
| 2005/0258582 | A1* | 11/2005 | Chou | F16F 1/041 267/177 |

FOREIGN PATENT DOCUMENTS

| | | | | |
|---|---|---|---|---|
| CN | 104554332 | * | 4/2015 | |
| CN | 104554332 | A * | 4/2015 | |
| EP | 3196093 | | 7/2017 | |
| WO | WO-2017063313 | A1 * | 1/2016 | |
| WO | WO-2017063313 | A * | 4/2017 | B61F 9/00 |

OTHER PUBLICATIONS

English machined translation of CN—104554332, (Apr. 29, 2015.*
English machined translation of WO-2017063313 (Jan. 18, 2016).*

* cited by examiner

*Primary Examiner* — Robert A. Siconolfi
*Assistant Examiner* — San M Aung

(57) ABSTRACT

The train anti-derailment and braking system is configured for use with a train. The train anti-derailment and braking system is an emergency device that secures and slows the train in circumstances where a load wheel is about to be separated from a rail. The train anti-derailment and braking system further forms a sacrificial structure that can be used as a supplemental braking system in emergency situations. The train anti-derailment and braking system comprises an anti-derailment structure and a braking structure. The anti-derailment structure is a mechanical apparatus that secures and slows the train in potential derailment situations. The braking structure is a mechanical device that forces the anti-derailment structure into the rail in emergency situations.

18 Claims, 3 Drawing Sheets

TRAIN ANTI-DERAILMENT AND BRAKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including trains and braking elements for a train, more specifically, a braking system that comes into operation to prevent derailments or in derailments. (B60T7/124)

SUMMARY OF INVENTION

The train anti-derailment and braking system is configured for use with a train. The train is further defined with a load wheel, a car frame, an axle, and a bearing. The axle and the bearing attach the load wheel to the car frame. The load wheel forms a load path that transfers a portion of the load of the car frame to a rail. The rail is a continuous metal structure that guides the direction of motion of the load wheel of the train. The rail further comprises a rail head, a web, and an support structure. The train anti-derailment and braking system is an emergency device that secures and slows the train in circumstances where the load wheel is about to be separated from the rail. The train anti-derailment and braking system further forms a sacrificial structure (braking material, i.e., brake pads) used as a supplemental braking system in emergency situations. The train anti-derailment and braking system comprises an anti-derailment structure and a braking structure. The anti-derailment structure is a mechanical apparatus that secures and slows the train in potential derailment situations. The braking structure is a mechanical device that forces the anti-derailment structure into the rail in emergency situations.

These together with additional objects, features and advantages of the train anti-derailment and braking system will be readily apparent to those of ordinary skill in the art upon reading the following detailed description of the presently preferred, but nonetheless illustrative, embodiments when taken in conjunction with the accompanying drawings.

In this respect, before explaining the current embodiments of the train anti-derailment and braking system in detail, it is to be understood that the train anti-derailment and braking system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the train anti-derailment and braking system.

It is therefore important that the claims be regarded as including such equivalent construction insofar as they do not depart from the spirit and scope of the train anti-derailment and braking system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
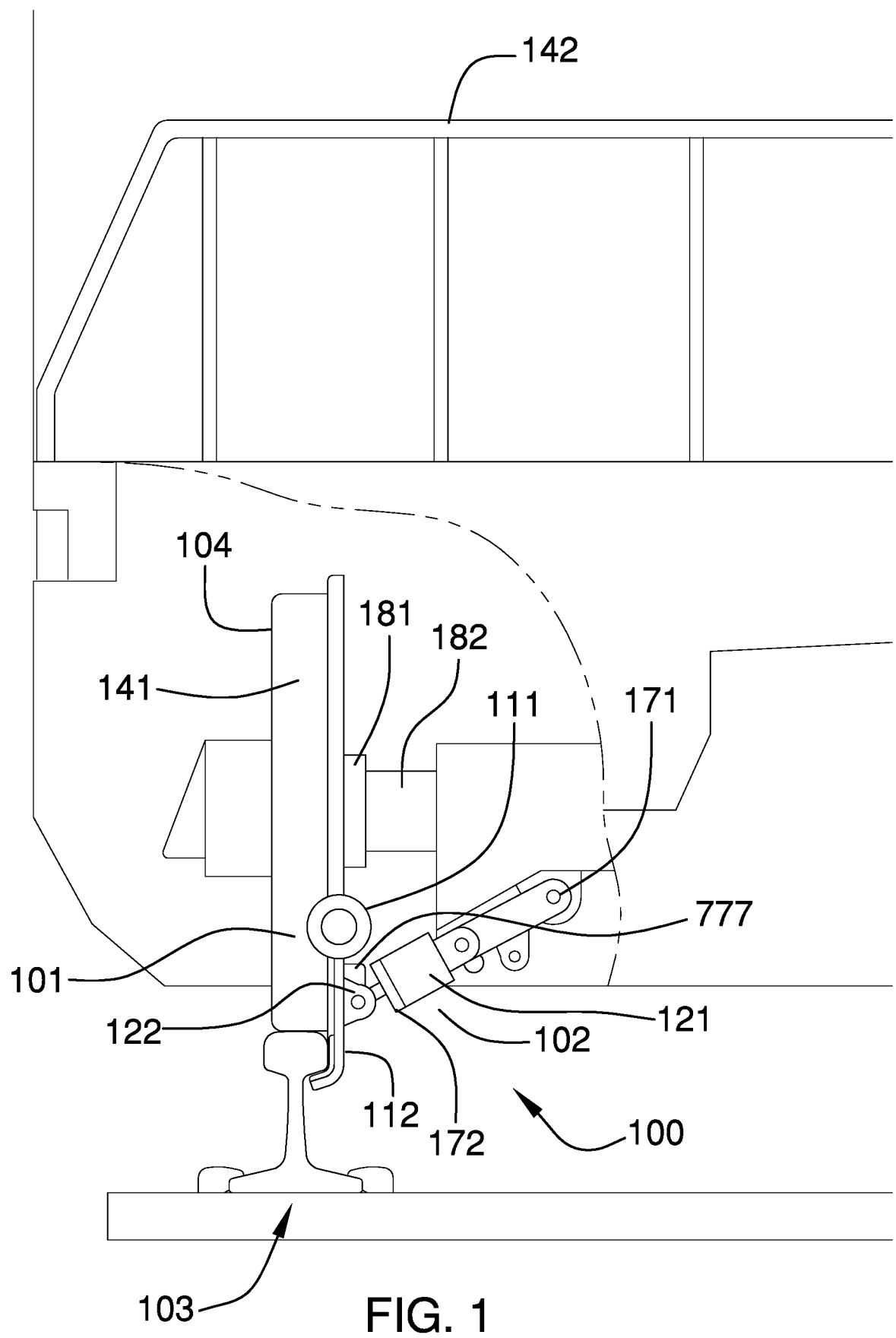
FIG. 1 is a posterior view of an embodiment of the disclosure.
Figure 2:
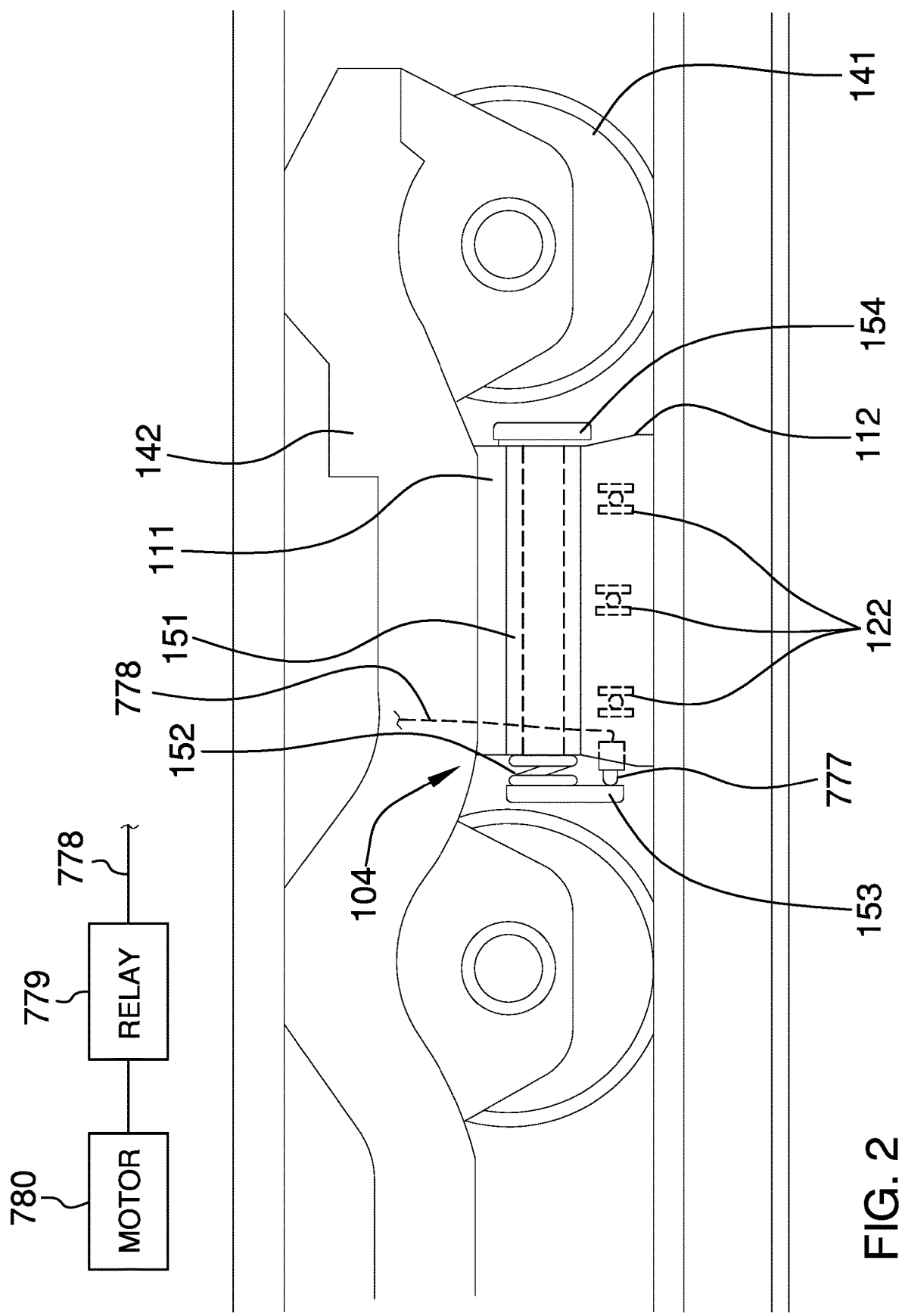
FIG. 2 is an outside view of an embodiment of the disclosure.
Figure 3:
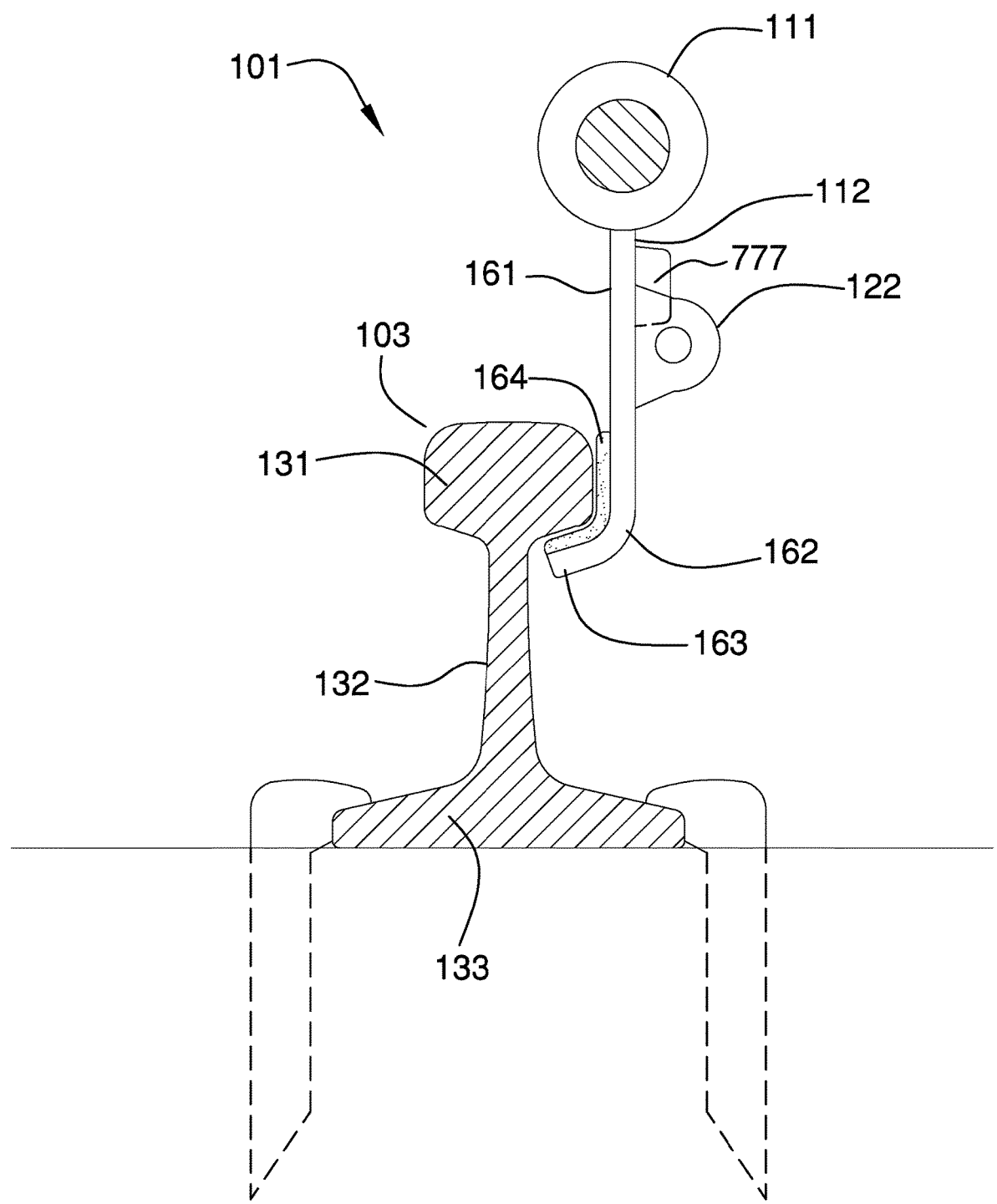
FIG. 3 is a detail view of an embodiment of the disclosure.

Detailed reference will now be made to one or more potential embodiments of the disclosure, which are illustrated in FIGS. 1 through 3.

The train anti-derailment and braking system 100 (hereinafter invention) is configured for use with a train 104. The train 104 is further defined with a load wheel 141, a car frame 142, an axle 182 and a bearing 181. The axle 182 and the bearing 181 attach the load wheel 141 to the car frame 142. The load wheel 141 forms a load path that transfers a portion of the load of the car frame 142 to a rail 103. The invention 100 is further configured for use with a rail 103. The rail 103 is a continuous metal structure that guides the direction of motion of the load wheel 141 of the train 104. The rail 103 further comprises a rail head 131, a web 132, and an support structure 133. The invention 100 is an emergency device that secures and slows the train 104 in circumstances where the load wheel 141 is about to be separated from the rail 103. The invention 100 further forms a sacrificial structure that can be used as a supplemental braking system in emergency situations.

The invention 100 comprises an anti-derailment structure 101 and a braking structure 102. The anti-derailment structure 101 is a mechanical apparatus that secures and slows the train 104 in potential derailment situations. The braking structure 102 is a mechanical device that forces the anti-derailment structure 101 into the rail 103 in emergency situations.

The rail 103 is an irregular prism-shaped structure. The rail 103 forms a portion of the load path that transfers the load of the car frame 142 to the train 104 track. The rail 103 is a metal structure used to guide the direction of motion of the load wheel 141. The use of a rail 103 to form a train 104 track is well-known and documented in the transportation arts.

The rail head 131 is a rounded rectangular prism structure. The rail head 131 forms the superior structure of the irregular prism structure of the rail 103. The load wheel 141 of the train 104 rests on the rail head 131. The support structure 133 is an irregular prism-shaped structure. The support structure 133 forms a pedestal that transfers a portion of the load of the train 104 to the supporting surface on which the train 104 operates.

The web 132 is a rectangular prism structure. The web 132 attaches the rail head 131 to the support structure 133. The minimum span of length of the diameter of the web 132 in the lateral direction is lesser than the minimum span of length of the rail head 131 in the lateral direction such that the rail head 131 overhangs the web 132. The minimum span of length of the diameter of the web 132 in the lateral direction is lesser than the minimum span of length of the support structure 133 in the lateral direction such that the support structure 133 extends beyond the web 132.

The train 104 is a vehicle that specializes in transporting materials between two or more fixed locations. The train 104 is well-known and documented in the transportation arts.

The load wheel 141 is a wheel that forms a load path that transfers a portion of the load of the car frame 142 of the train 104 to the rail 103. The load wheel 141 is a rotating structure that allows the car frame 142 of the train 104 to roll. The load wheel 141 attaches to the car frame 142. The car frame 142 is a containment structure. The car frame 142 carries the load that is transported by the train 104. The bearing 181 is a rolling element bearing. The bearing 181 attaches the load wheel 141 to the axle 182. The axle 182 is a shaft that attaches the axle 182 and the load wheel 141 to the car frame 142.

The anti-derailment structure 101 is a mechanical structure. The anti-derailment structure 101 attaches to the car frame 142 of the train 104. The anti-derailment structure 101 projects from the car frame 142 towards the rail 103. The anti-derailment structure 101 is designed to follow the proximal side of the rail 103 without coming in contact with the rail 103 as the train 104 is traveling normally. The form factor of the anti-derailment structure 101 is selected such that should the motion of the train 104 become abnormal, the anti-derailment structure 101 will bind the car frame 142 to the rail 103 such that the anti-derailment structure 101 will prevent the load wheel 141 from leaving the rail 103. The anti-derailment structure 101 comprises a supporting arm 111 and a tracking plate 112.

The supporting arm 111 attaches the tracking plate 112 to the car frame 142 of the train 104. The supporting arm 111 is positioned to mount the tracking plate 112 between a first load wheel 141 and an adjacent second load wheel 141. The supporting arm 111 suspends that tracking plate 112 such that the tracking plate 112 is positioned next to the proximal side of the rail 103 on which the first load wheel 141 and the adjacent second load wheel 141 rotate. The supporting arm 111 comprises a jib 151, a shock absorber 152, an anterior plate 153, and a posterior plate 154.

The jib 151 is a hollow cylindrical structure. The jib 151 attaches the tracking plate 112 to the car frame 142 of the train 104. The jib 151 attaches to the car frame 142 such that the center axis of the jib 151 is parallel to the center axis of the irregular prism shape of the rail 103. The jib 151 attaches to the car frame 142 such that the center axis of the jib 151 is parallel to the primary sense of direction of the train 104.

The shock absorber 152 is a helical spring. The shock absorber 152 is a compression spring. The shock absorber 152 inserts into the jib 151. In its relaxed shape, the span of the length of the center axis of the shock absorber 152 is greater than the span of the length of the center axis of the jib 151 such that the shock absorber 152 extends beyond the open end of the capped tube structure formed by the jib 151 and the posterior plate 154. The shock absorber 152 absorbs transient forces such that the tracking plate 112 remains in contact with the rail 103 for as long as possible during an emergency situation. The shock absorber 152 further provides a responsive physical structure that allows for the detection of forces that can potentially derail the train 104 while the train 104 is in operation.

The posterior plate 154 is a disk-shaped structure that attaches to an open end of the jib 151 to form a capped tube. The posterior plate 154 forms the aft-most portion of the invention 100. The posterior plate 154 contains the shock absorber 152 within the jib 151. The anterior plate 153 is a plate that attaches to the most forward end of the shock absorber 152. The anterior plate 153 forms a surface that is designed to receive and transfer forces to the shock absorber 152 during an emergency situation. The anterior plate 153 forms the most forward element of the invention 100.

The tracking plate 112 is a non-Euclidean disk structure. The tracking plate 112 projects vertically away from the supporting arm 111 in the inferior direction. The tracking plate 112 is positioned on the proximal side of the rail 103. The tracking plate 112 is not in contact with the rail 103 when the train 104 is moving normally.

The space between the tracking plate 112 and the rail 103 is designed such that when the load wheel 141 of the train 104 is not following the normal path along the rail 103, the tracking plate 112 will come in contact with the rail 103. By following the normal path is meant that the rotation and the transit path of the load wheel 141 are within the designed engineering parameters of the load wheel 141 and the rail 103. When contact occurs between the tracking plate 112 and the rail 103, the tracking plate 112 will either: a) return the load wheel 141 to its normal path; or, b) creating a friction between the tracking plate 112 and the rail 103 that serves to slow down the train 104.

The tracking plate 112 comprises an extension plate 161, an elbow 162, a contact plate 163, and a braking pad 164.

The extension plate 161 is a rectangular disk structure. The lateral face of the extension plate 161 that has the longest span of length attaches to the lateral face of the cylindrical structure of the jib 151. The extension plate 161 projects away from the jib 151 such that the plane formed by the congruent faces of the extension plate 161 are perpendicular to the center of rotation of the load wheel 141 of the car frame 142. The extension plate 161 projects away from the jib 151 in the inferior direction. The extension plate 161 is an extension structure. The extension plate 161 bridges the reach between the jib 151 and the combination of the elbow 162 and the contact plate 163.

The elbow 162 is a non-Euclidean structure. The elbow 162 forms the curvature found within the congruent faces that form the non-Euclidean disk structure of the tracking plate 112. The elbow 162 attaches the contact plate 163 to the extension plate 161.

The contact plate 163 is formed such that should the motion of the train 104 become abnormal, the contact plate 163 will bind the car frame 142 to the rail 103 such that the contact plate 163 will prevent the load wheel 141 from leaving the rail 103.

The contact plate 163 is a rectangular structure. The lateral face of the contact plate 163 that has the longest span of length attaches to a lateral face of the extension plate 161 using the elbow 162. The span of the length lateral face of the contact plate 163 that has the longest span of length equals the span of the length of the extension plate 161 that has the longest span of length. The elbow 162 positions the contact plate 163 relative to the rail 103 such that: a) the contact plate 163 is between the rail head 131 and the web 132; b) the contact plate 163 is positioned beneath the overhang formed by the rail head 131; and, c) the contact plate 163 contacts neither the web 132 nor the rail head 131 when the train 104 is moving normally.

The braking pad 164 is a sacrificial material. The braking pad 164 is applied to the distal congruent face of the tracking plate 112. The braking pad 164 creates a high friction braking surface that slows the motion of the train 104 when the distal congruent face of the tracking plate 112 is in contact with the rail 103 in an emergency situation. The braking pad 164 creates a similar braking force when the braking structure 102 is used in an emergency situation.

The braking structure 102 is an emergency braking apparatus. The braking structure 102 attaches the anti-derailment structure 101 to the car frame 142. The braking structure 102 is controlled by the engineer of the train 104. The braking structure 102 is automatically engaged by the electrical sensing switch 777, or when the engineer determines that the train 104 is in an emergency situation. The engagement of the braking structure 102 uses the anti-derailment structure 101 as a sacrificial structure. Specifically, the braking structure 102 forces the anti-derailment structure 101 into the rail 103 in an emergency situation. In this scenario, the friction between the anti-derailment structure 101 and the rail 103 provides the additional forces necessary to stop the train 104. The braking structure 102 comprises one or more hydraulic cylinders 121 and one or more plate mounts 122.

The electrical sensing switch 777 is a separate braking system that is completely independent of the system that the train is using. The electrical sensing switch 777 is mounted on the tracking plate 112. In the event of a derailment, the electrical sensing switch 777 makes contact with either the anterior plate 153 or the posterior plate 154 (see FIG. 2) in order to close a circuit 778 that extends over to a motor controller relay 779 in order to de-energize a motor 780 thereby decelerating the train 104. It shall be noted that the motor 780 is responsible for moving the train 104.

Each of the one or more hydraulic cylinders 121 is a hydraulic cylinder. Each of the one or more hydraulic cylinders 121 is controlled by the engineer of the train 104. Each of the one or more hydraulic cylinders 121 attaches the car frame 142 of the train 104 to the anti-derailment structure 101. Each of the one or more hydraulic cylinders 121 is a hydraulically powered device. Each of the one or more hydraulic cylinders 121 operates in concert to force the tracking plate 112 into the rail 103 when an emergency braking action is required. Each of the one or more hydraulic cylinders 121 further comprises a fixed end 171 and a piston end 172.

The fixed end 171 is the end of the each hydraulic cylinder selected from the one or more hydraulic cylinders 121 that attaches to the car frame 142 of the train 104. The piston end 172 is the end of the each hydraulic cylinder selected from the one or more hydraulic cylinders 121 that attaches to the tracking plate 112 using the one or more plate mounts 122.

Each of the one or more plate mounts 122 is a mounting structure. There is a one to one correspondence between the one or more plate mounts 122 and the one or more hydraulic cylinders 121. Each of the one or more plate mounts 122 attaches the piston end 172 of the associated hydraulic cylinder selected from the one or more hydraulic cylinders 121 to the tracking plate 112 of the anti-derailment structure 101.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Axle: As used in this disclosure, an axle is a cylindrical shaft inserts through the center of one or more wheels such that the axis of rotation of the one or more wheels and the center axis of the axle are aligned.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Brake: As used in this disclosure, a brake is a device that is used to slow or stop the motion of a machine or a vehicle.

Bow: As used in this disclosure, the bow refers to the anterior side of an object, vehicle, or vessel. Specifically, the bow refers to the most forward element of the object in the direction of the primary sense of direction of the object vehicle, or vessel.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Compression Spring: As used in this disclosure, a compression spring is a spring that resists forces attempting to compress the spring in the direction of the center axis of the spring. The compression spring will return to its original position when the compressive force is removed.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Distal: As used in this disclosure, distal refers to a directional sense or location of an object. Specifically, distal refers to a first object, or a side of a first object, that is distal from the medial axis of a vehicle that is parallel to the primary sense of direction of the vehicle.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is term that relates a first object to a second object. When the first object is closer to the bow of a vehicle, the first object is said to be forward of the second object. The term is commonly used on vessels and vehicles. See bow, aft, port, starboard, and stern Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Helical Spring: As used in this disclosure, a helical spring is a compression spring shaped in the form of a cylindrical helix.

Hydraulic: As used in this disclosure, hydraulic refers to a device wherein the movement of the device is powered using a liquid under pressure.

In Concert: As used in this disclosure, the term in concert is used to indicate that a plurality of structures are operating in a coordinated or synchronized manner.

Inferior: As used in this disclosure, the term inferior refers to a directional reference that is parallel to and in the same direction as the force of gravity when an object is positioned or used normally.

Jib: As used in this disclosure, a jib is a beam structure that is used to suspend a load.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to an edge of a rectangular or rectilinear structure.

Non-Euclidean Disk: As used in this disclosure, a non-Euclidean structure is a disk-shaped structure wherein the congruent end (faces) of the disk structure lies on a non-Euclidean plane.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pedestal: As used in this disclosure, a pedestal is an intermediary load bearing structure that that transfers a load path between a supporting surface and an object, structure, or load.

Plate: As used in this disclosure, a plate is a smooth, flat and semi-rigid or rigid structure that has at least one dimension that: a) is of uniform thickness; and b) that appears thin relative to the other dimensions of the object. Plates are often disks. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Proximal: As used in this disclosure, the term proximal is used to describe the relative location of two objects. The proximal object is the object that is closer to a specified reference point. In this disclosure, the specified reference point is the medial axis of a vehicle that is parallel to the primary sense of direction of the vehicle.

Radial: As used in this disclosure, the term radial refers to a direction that: 1) is perpendicular to an identified central axis; or, 2) projects away from a center point.

Reach: As used in this disclosure, reach refers to a span of distance between any two objects.

Relaxed Shape: As used in this disclosure, a structure is considered to be in its relaxed state when no shear, strain, or torsional forces are being applied to the structure.

Rolling Element Bearing: As used in this disclosure, a rolling element bearing comprises is a type of bearing comprising an inner race, an outer race, and a plurality of ball bearings. The plurality of ball bearings are sphere shaped. The inner race is a circular ring. The outer race is a circular ring with an inner diameter that is greater than the outer diameter of the inner race. The plurality of ball bearings are placed between the inner race and the outer race such that: 1) the inner race and the outer race are coaxially positioned; and, 2) the inner race rotates relative to the outer race. Typically, the inner race attaches to a first object and the outer race attaches to a second object such that the first object rotates relative to the second object. Typically, a rolling element bearing is disk-shaped. A rolling element bearing is said to be "locking" when the relative position of the inner race locks into a fixed position relative to the outer race. Rolling element bearings, including locking versions, are: 1) commercially available; and, 2) well-known and documented in the mechanical arts.

Sacrificial Material: As used in this disclosure, a sacrificial material is a material that protects a first object or structure from damage. More specifically, the sacrificial material protects the second object or structure by being damaged during use of the second object or structure.

Sacrificial Structure: As used in this disclosure, a sacrificial structure is a first object or structure that protects a second object or structure from damage. More specifically, the sacrificial structure protects the second object or structure by being damaged instead of the second object or structure.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Tube: As used in this disclosure, the term tube is used to describe a rigid hollow prism with two open ends. While tubes that are suitable for use in this disclosure are often used to transport or conveys fluids or gases, the purpose of the tubes in this disclosure is structural. In this disclosure, the terms inner dimension and outer dimension of a tube are used as they would be used by those skilled in the plumbing arts.

Vehicle: As used in this disclosure, a vehicle is a motorized device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A transportation safety device comprising:
an anti-derailment structure and a braking structure;
wherein the transportation safety device is configured for use with a train;
wherein the transportation safety device is configured for use with a rail;
wherein the train is configured for use with the rail;
wherein the transportation safety device is an emergency device;
wherein the transportation safety device secures and slows the train in circumstances where the train is about to be separated from the rail;
wherein the transportation safety device further forms a sacrificial structure;
wherein the transportation safety device is a supplemental braking system;
wherein the anti-derailment structure is a mechanical apparatus that secures and slows the train in potential derailment situations;
wherein the braking structure is a mechanical device that forces the anti-derailment structure into the rail;
wherein the train is a vehicle that specializes in transporting materials between two or more fixed locations;
wherein the train is further defined with a load wheel, a car frame, an axle, and a bearing;
wherein the axle and the bearing attach the load wheel to the car frame;
wherein the load wheel forms a load path that transfers a portion of the load of the car frame to the rail;
wherein the load wheel is a rotating structure that allows the car frame of the train to roll;
wherein the load wheel attaches to the car frame;
wherein the car frame is a containment structure;
wherein the bearing is a rolling element bearing;
wherein the bearing attaches the load wheel to the axle;
wherein the axle is a shaft that attaches the axle and the load wheel to the car frame;
wherein the supporting arm comprises a jib, a shock absorber, an anterior plate, and a posterior plate;
wherein an electrical sensing switch is included, and is a separate braking system that is completely independent of the system that the train is using;
wherein the electrical sensing switch is mounted on the tracking plate;
wherein during a derailment, the electrical sensing switch makes contact with either the anterior plate or the posterior plate in order to close a circuit that extends over to a motor controller relay in order to de-energize a motor thereby decelerating the train.

2. The transportation safety device according to claim 1 wherein the rail is a continuous metal structure that guides the direction of motion of the load wheel of the train;
wherein the rail is an irregular prism-shaped structure;
wherein the rail further comprises a rail head, a web, and an support structure;
wherein the rail head is a rounded rectangular prism structure;
wherein the rail head forms the superior structure of the irregular prism structure of the rail;
wherein the load wheel of the train rests on the rail head;
wherein the support structure is an irregular prism-shaped structure;
wherein the support structure forms a pedestal that transfers a portion of the load of the train to the supporting surface on which the train operates;
wherein the web is a rectangular prism structure;
wherein the web attaches the rail head to the support structure;
wherein the minimum span of length of the diameter of the web in the lateral direction is lesser than the minimum span of length of the rail head in the lateral direction such that the rail head overhangs the web;
wherein the minimum span of length of the diameter of the web in the lateral direction is lesser than the minimum span of length of the support structure in the lateral direction such that the support structure extends beyond the web.

3. The transportation safety device according to claim 2 wherein the anti-derailment structure is a mechanical structure;
wherein the anti-derailment structure attaches to the car frame of the train;
wherein the anti-derailment structure projects from the car frame towards the rail;
wherein the anti-derailment structure operates such that anti-derailment structure will bind the car frame to the rail such that the anti-derailment structure will prevent the load wheel from leaving the rail.

4. The transportation safety device according to claim 3 wherein the braking structure is an emergency braking apparatus;
wherein the braking structure attaches the anti-derailment structure to the car frame;
wherein the engagement of the braking structure uses the anti-derailment structure as a sacrificial structure;
wherein specifically, the braking structure forces the anti-derailment structure into the rail;
wherein the friction between the anti-derailment structure and the rail provides forces to stop the train.

5. The transportation safety device according to claim 4 wherein the anti-derailment structure comprises a supporting arm and a tracking plate;
wherein the supporting arm attaches the tracking plate to the car frame of the train;
wherein the supporting arm is positioned to mount the tracking plate between a first load wheel and an adjacent second load wheel;
wherein the supporting arm suspends that tracking plate such that the tracking plate is positioned next to the proximal side of the rail on which the first load wheel and the adjacent second load wheel rotate.

6. The transportation safety device according to claim 5 wherein the tracking plate is a non-Euclidean structure;
wherein the tracking plate projects vertically away from the supporting arm in the inferior direction;

wherein the tracking plate is positioned on the proximal side of the rail;
wherein the tracking plate is not in contact with the rail when the train is moving normally;
wherein the space between the tracking plate and the rail is such that when the load wheel of the train is not following the normal path along the rail, the tracking plate will come in contact with the rail;
wherein following the normal path means that the rotation and the transit path of the load wheel are within the designed engineering parameters of the load wheel and the rail;
wherein when contact occurs between the tracking plate and the rail, the tracking plate will either: a) return the load wheel to its normal path; or, b) creating a friction between the tracking plate and the rail that serves to slow down the train.

7. The transportation safety device according to claim 6
wherein the shock absorber inserts into the jib;
wherein the posterior plate attaches to the jib;
wherein the anterior plate attaches to the shock absorber.

8. The transportation safety device according to claim 7
wherein the jib is a hollow cylindrical structure;
wherein the jib attaches the tracking plate to the car frame of the train;
wherein the jib attaches to the car frame such that the center axis of the jib is parallel to the center axis of the irregular prism shape of the rail;
wherein the jib attaches to the car frame such that the center axis of the jib is parallel to the primary sense of direction of the train.

9. The transportation safety device according to claim 8
wherein the shock absorber is a helical spring;
wherein the shock absorber is a compression spring;
wherein the span of the length of the center axis of the shock absorber in a relaxed shape is greater than the span of the length of the center axis of the jib.

10. The transportation safety device according to claim 9
wherein the posterior plate is a disk-shaped structure that attaches to an open end of the jib to form a capped tube;
wherein the anterior plate is a plate that attaches to the most forward end of the shock absorber;
wherein the anterior plate forms a surface that is designed to receive and transfer forces to the shock.

11. The transportation safety device according to claim 10
wherein the tracking plate comprises an extension plate, an elbow, a contact plate, and a braking pad;
wherein the elbow attaches the contact plate to the extension plate;
wherein the braking pad attaches to the elbow and the contact plate.

12. The transportation safety device according to claim 11
wherein the extension plate is a rectangular disk structure;
wherein the lateral face of the extension plate that has the longest span of length attaches to the lateral face of the cylindrical structure of the jib;
wherein the extension plate projects away from the jib such that the planes formed by the congruent faces of the extension plate are perpendicular to the center of rotation of the load wheel of the car frame;
wherein the extension plate projects away from the jib in the anterior direction;
wherein the extension plate is an extension structure;
wherein the extension plate bridges the reach between the jib and the combination of the elbow and the contact plate.

13. The transportation safety device according to claim 12
wherein the elbow is a non-Euclidean structure;
wherein the elbow forms the curvature found within the congruent faces that form the non-Euclidean disk structure of the tracking plate.

14. The transportation safety device according to claim 13
wherein the contact plate is a rectangular disk structure;
wherein the contact plate is formed such that should the motion of the train become abnormal, the contact plate will bind the car frame to the rail such that the contact plate will prevent the load wheel from leaving the rail;
wherein the lateral face of the contact plate that has the longest span of length attaches to a lateral face of the extension plate using the elbow;
wherein the span of the length lateral face of the contact plate that has the longest span of length equals the span of the length of the extension plate that has the longest span of length.

15. The transportation safety device according to claim 14
wherein the elbow positions the contact plate relative to the rail such that: a) the contact plate is between the rail head and the web; b) the contact plate is positioned beneath the overhang formed by the rail head; and, c) the contact plate contacts neither the web nor the rail head when the train is moving normally.

16. The transportation safety device according to claim 15
wherein the braking pad is a sacrificial material;
wherein the braking pad is applied to the distal congruent face of the tracking plate;
wherein the braking pad creates a high friction braking surface that slows the motion of the train when the distal congruent face of the tracking plate is in contact with the rail;
wherein the braking pad creates a similar braking force when the braking structure is in use.

17. The transportation safety device according to claim 16
wherein the braking structure comprises one or more hydraulic cylinders and one or more plate mounts;
wherein the one or more plate mounts attach the one or more hydraulic cylinders to the extension plate of the tracking plate.

18. The transportation safety device according to claim 17
wherein each of the one or more hydraulic cylinders is a hydraulic cylinder;
wherein each of the one or more hydraulic cylinders attaches the car frame of the train to the anti-derailment structure;
wherein each of the one or more hydraulic cylinders is a hydraulically powered device;
wherein each of the one or more hydraulic cylinders operates in concert to force the tracking plate into the rail when an emergency braking action is required;
wherein each of the one or more plate mounts is a mounting structure;
wherein there is a one to one correspondence between the one or more plate mounts and the one or more hydraulic cylinders.

\* \* \* \* \*